Oct. 30, 1951  R. TORRES  2,573,119
COMBINED SHOCK ABSORBING AND MOTOR VEHICLE
SPRING SUSPENSION ARRANGEMENT
Filed Jan. 19, 1949

INVENTOR.
ROBERTO TORRES
BY
Laforest S. Saulsbury
ATTORNEY

Patented Oct. 30, 1951

2,573,119

UNITED STATES PATENT OFFICE 2,573,119

COMBINED SHOCK ASBORBING AND MOTOR VEHICLE SPRING SUSPENSION ARRANGEMENT

Roberto Torres, Mexico City, Mexico

Application January 19, 1949, Serial No. 71,666
In Mexico April 15, 1948

1 Claim. (Cl. 267—31)

This invention relates to shock absorbing apparatus adapted for use with motor vehicle spring suspensions.

Heretofore, shock absorbing devices have been formed primarily of metal springs and rubber cushions. These devices have had to be of rugged and more or less rigid construction in order to withstand the rough usage which they are given and hence do not give the full softening action to make for easy riding of the vehicle which is desired.

It is an object of the present invention to provide a shock absorber device utilizing compressed air taken from a supply reservoir and directed to one side of a diaphragm at a predetermined pressure whereby the shock absorber can be readily adapted to the particular spring on which the shock absorbing device is being used and to the load on the vehicle and wherein the shock absorber can be converted into an aid for the vehicle springs at times of overloading the vehicle.

It is another object of the invention to provide a combined spring suspension and shock absorber utilizing compressed air wherein the connections of the shock absorbing part with the springs are adjustable and simple and wherein the shock absorbing part has control valve means on the discharge side of the diaphragm to throttle the air leaving the casing upon the downward thrust of the spring suspension.

Other objects of the present invention are to provide a compressed air shock absorber for vehicle suspension springs which is of simple construction, inexpensive to manufacture, easy to install, compact, sturdy and rugged, has a minimum number of parts, easy to adjust and regulate, and efficient in operation.

Figure 1:
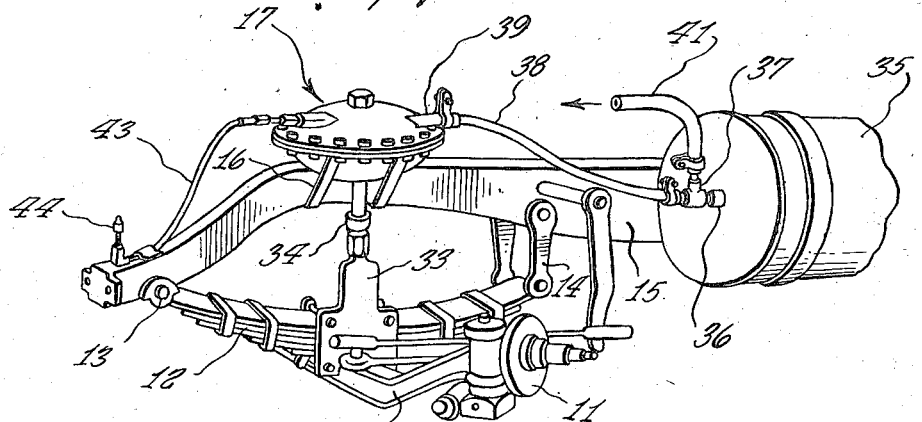
Figure 2:
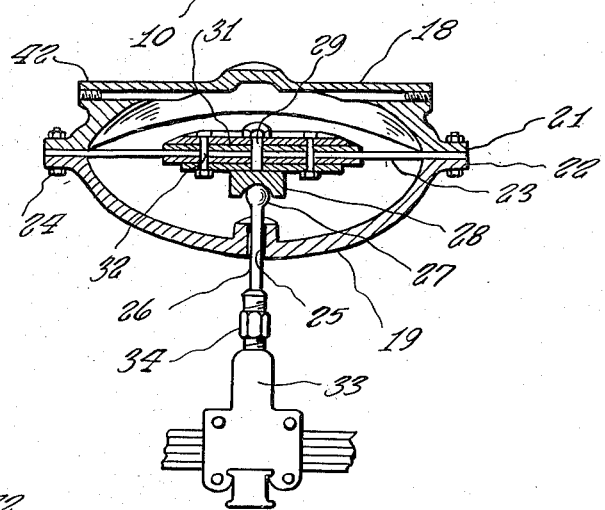
Figure 3:
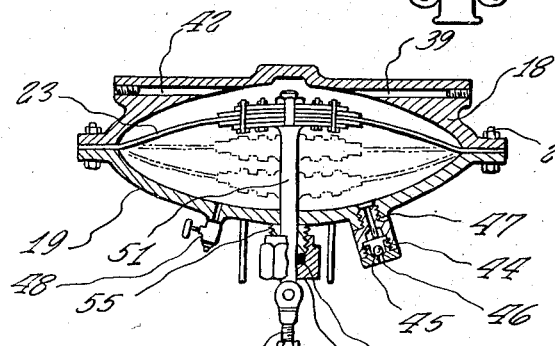

For a better understanding of the invention, reference may be had to the following detailed description taken in connection with the accompanying drawing, in which:

Figure 1 is a perspective view of the shock absorber and suspension spring arrangement embodying the features of the present invention and showing its installation on the vehicle frame, Figure 2 is a sectional view of the shock absorbing device taken generally on line 2—2 of Figure 1, Figure 3 is an enlarged sectional view of a modified form of the invention.

Referring now particularly to Figures 1 and 2, 10 represents a forward axle of a vehicle having a steering knuckle 11 thereon and which is attached to a multiple leaf spring 12. This spring is connected by shackles 13 and 14 to a vehicle frame 15.

On the frame 15 are bracket members 16 on which is supported my shock absorber device 17. My shock absorber device comprises top and bottom semi-elliptical and separable casing members 18 and 19 having respectively flanges 21 and 22. Between these flanges is extended a diaphragm 23 of flexible and resistant material. This assembly is connected together by securing bolts 24 circumferentially spaced about and between the respective flanges. The lower member 19 has a central opening 25 through which a connecting rod 26 can slide. This connecting rod has a ball formation 27 on its upper end engaging with a wear surface of a wear plate 28 secured by a bolt 29, to spring reinforcing plates on the diaphragm 23. These spring reinforcing plates are indicated at 31 and lie on the opposite sides of the diaphragm and are connected by bolts 32 extending between them and through the diaphragm. The ball formation 27 on the wear plate 28 permits a certain amount of angular movement of the connecting rod 26 within the opening 25 of the lower member 19.

Fixed to the leaf springs 12 is a bracket 33 into which the connecting rod may be adjusted to accommodate the shock absorber to the spring and to give the connecting rod a position whereby the diaphragm will lie at the proper elevation within the members for a given load.

A lock nut 34 is adjustable on the bracket 33 and the connecting rod 26 to fix the connecting rod in its adjusted position on the bracket.

On the vehicle frame 15 is a compressed air tank 35 having air at a predetermined pressure therein and an outlet 36. To this outlet 36 there is connected a T-fitting 37 to which is coupled a hose 38 for the delivery of air to an inlet projection 39 on the upper member 18. Air is accordingly supplied to the top side of the diaphragm 23 under a predetermined pressure whereby to maintain the diaphragm normally at its intermediate position within the members. This compressed air serves as the cushioning medium and to augment the spring effect for the carrying of an increased load.

As the spring 12 falls down as the result of an opening in the road, this movement will be delayed through the throttling action of air within the lower member 19 through the opening 25. The upward movement of the spring will be repelled by the action of the compressed air on the upper side of the diaphragm and in the upper member. After the impact has subsided, the diaphragm will be returned to its original position.

To the T-fitting 37 there is connected a pipe 41 which may be connected with other shock absorbers disposed at other locations on the vehicle.

From a sleeve projection 42 on the upper member 18 there is extended a pipe 43 connected to a valve fitting 44 to which air can be extended to the system by portable pump means to charge the tank 35 with compressed air.

Referring now to Figure 3, there is shown a modified form of the invention wherein the lower member is provided with an automatic ball valve arrangement 44 comprising a ball 45 adapted to lie over an opening 46 in the arrangement to normally close the arrangement to outgoing air as the diaphragm moves downwardly within the lower member 19. This valve arrangement is a unitary structure and is threaded into a boss 47 in the lower member 19. As the diaphragm moves upwardly air may be drawn past the ball valve arrangement into the lower member 19 and beneath the diaphragm 23.

On the downward movement of the diaphragm such air is discharged through a throttle valve arrangement 48 connected to the lower member at the opposite side thereof. By the use of ball valve arrangement 44 the speed of the return of the spring and diaphragm to their normal positions can be controlled.

Furthermore, with this modified arrangement the connecting rod as indicated at 51 is rigidly connected to the diaphragm 23 and the reinforcing plates 31 thereof. This connecting rod 51 is also fixed by an adjustable coupling 52 having a lock nut 53 to a bracket 54 on spring 12.

The connecting rod 51 is slidable through an opening in the lower member 19 and a projection 55 on the lower member to which a packing nut 56 is coupled. A packing 57 lies within the packing nut 56 and will prevent the leakage of air along the connecting rod and through the opening in the lower member 19 and its sleeve projection 55. The compressed air is supplied to the upper member in the same manner as above described in connection with the form of the invention shown in Figures 1 and 2. This compressed air is added to the device to properly position the diaphragm within the members depending in pressure upon the amount of overload.

While various changes may be made in the detail construction, it shall be understood that such changes shall be within the spirit and scope of the present invention as defined in the appended claim.

What is claimed is:

A combined shock absorbing and overloading device for vehicle spring suspensions comprising upper and lower casing members secured together to provide a casing and adapted to be connected to a vehicle frame, a flexible diaphragm connected between the casing members and dividing the space within the casing to provide chambers above and below the diaphragm, a compressed air tank connected to the upper member to supply air under pressure to the space above the diaphragm to augment the action of the spring suspension, spring reinforcing plate means lying on the opposite sides of the diaphragm and secured thereto, a wear plate having a socket recess therein and means for securing said wear plate to the diaphragm and to the reinforcing plate means, a connecting rod extending through the lower part of the casing and having a ball formation thereon engaging with the socket recess of the wear plate, adjustable means on the lower end of the connecting rod for effecting the connection thereof with the vehicle spring suspension, said lower member having opening means therein for controlling the outlet flow of air from the lower part of the casing to provide shock absorbing action and for the return of the atmospheric air to the lower part of the casing, said upper casing member having an air inlet opening, a pipe with a valve fitting thereon connected to the air inlet opening and adapted to form a connection therewith of an air charging device for placing the compression tank and the upper part of the casing under a predetermined pressure depending upon the load of the vehicle.

ROBERTO TORRES.

REFERENCES CITED

The following references are of record in the file of this patent:

UNITED STATES PATENTS

| Number | Name | Date |
|---|---|---|
| 598,982 | Egger | Feb. 15, 1898 |
| 770,847 | Downer | Sept. 27, 1904 |
| 1,077,472 | Hofmann | Nov. 4, 1913 |
| 1,085,818 | Oxnard | Feb. 3, 1914 |
| 1,776,279 | Beecher | Sept. 23, 1930 |
| 1,869,285 | Taber | July 26, 1932 |

FOREIGN PATENTS

| Number | Country | Date |
|---|---|---|
| 17,813 of 1914 | Great Britain | July 28, 1914 |
| 26,325 | France | June 12, 1923 |
| | Addition to 551,675 | |